(12) United States Patent
Lu

(10) Patent No.: US 6,996,312 B2
(45) Date of Patent: Feb. 7, 2006

(54) TUNABLE FABRY-PEROT FILTER

(75) Inventor: Liang-Ju Lu, Eden Prairie, MN (US)

(73) Assignee: Rosemount, Inc., Eden Prairie, MN (US)

( * ) Notice: Subject to any disclaimer, the term of this patent is extended or adjusted under 35 U.S.C. 154(b) by 240 days.

(21) Appl. No.: 10/425,509

(22) Filed: Apr. 29, 2003

(65) Prior Publication Data

US 2004/0218865 A1    Nov. 4, 2004

(51) Int. Cl.
G02B 6/26    (2006.01)
(52) U.S. Cl. .............................. 385/39; 385/50; 385/27
(58) Field of Classification Search ................. 385/39, 385/27, 50; 359/578
See application file for complete search history.

(56) References Cited

U.S. PATENT DOCUMENTS

| | | | |
|---|---|---|---|
| 4,825,262 A * | 4/1989 | Mallinson ................... 356/454 |
| 5,251,275 A * | 10/1993 | Kuriyama et al. ............ 385/14 |
| 5,561,523 A | 10/1996 | Blomberg et al. |
| 5,818,586 A | 10/1998 | Lehto et al. |
| 6,078,395 A | 6/2000 | Jourdain et al. |
| 6,241,397 B1 * | 6/2001 | Bao et al. ..................... 385/73 |
| 6,252,716 B1 * | 6/2001 | Paiam ........................ 359/618 |
| 6,275,324 B1 | 8/2001 | Sneh |
| 6,295,130 B1 | 9/2001 | Sun et al. |
| 6,339,603 B1 | 1/2002 | Flanders et al. |
| 6,341,039 B1 | 1/2002 | Flanders et al. |
| 6,345,059 B1 | 2/2002 | Flanders |
| 6,351,577 B1 | 2/2002 | Aksyuk et al. |
| 6,366,592 B1 | 4/2002 | Flanders |
| 6,373,632 B1 | 4/2002 | Flanders |
| 6,438,149 B1 | 8/2002 | Tayebati et al. |
| 6,445,838 B1 | 9/2002 | Caracci et al. |
| 6,449,403 B1 * | 9/2002 | Cush et al. ................... 385/15 |
| 2001/0055119 A1 * | 12/2001 | Wood et al. ................ 356/519 |
| 2002/0074485 A1 | 6/2002 | Atia et al. |
| 2002/0080504 A1 | 6/2002 | Atia |
| 2002/0081073 A1 | 6/2002 | Lee et al. |
| 2002/0131458 A1 | 9/2002 | Sirbu et al. |
| 2002/0131670 A1 | 9/2002 | Cush et al. |
| 2003/0076505 A1 * | 4/2003 | Bao et al. ................... 356/480 |
| 2003/0174952 A1 * | 9/2003 | Fan ............................ 385/39 |
| 2004/0151438 A1 * | 8/2004 | Ferguson ..................... 385/78 |
| 2004/0196874 A1 * | 10/2004 | Spiegelberg et al. ........... 372/6 |

FOREIGN PATENT DOCUMENTS

WO    02/086582 A1    10/2002

OTHER PUBLICATIONS

Lin et al., "Micromachined three-dimensional tunable Fabry-Perot etalons", *SPIE*, vol. 2641, pp. 20-27.

(Continued)

*Primary Examiner*—Rodney Bovernick
*Assistant Examiner*—Mike Stahl
(74) *Attorney, Agent, or Firm*—Altera Law Group, LLP

(57) ABSTRACT

A tunable Fabry Perot filter (TFPF) uses the hybrid integration of MEMS and micro-optics. The mirrors forming the TFPF are actively aligned to provide a high finesse TFPF. One of the reflectors is mounted to a flexible member, for example a beam member fixed at both ends. The flexible member is deflectable in a direction parallel to the axis of the TFPF so as to adjust the gap between the reflectors, thus tuning the TFPF. One or both of the mirrors may be deposited on the end of an optical fiber.

10 Claims, 14 Drawing Sheets

OTHER PUBLICATIONS

Lin et al., "*Tunable Three-Dimensional Solid Fabry-Perot Etalons Fabricated by Surface-Micromachining*", *IEEE Photonic Technology Letters*, vol. 8, No. 1, Jan. 1996, pp 101-103.

Moon et al., "*Performance Limits of a Micromachined Tunable-Cavity Filter*", *Modeling and Simulation of Microsystems 2001*, ISBN 0-9708275-0-4, pp. 278-281.

*Fiber Fabry-Perot Tunable Filter (FFP-TF)*, *LANL Gigabit Optical Networking*, Jan. 23, 1997, p. 1.

"*Tunable analyser monitors multi-wavelength systems*", *FibreSystems*, Feb. 1999.

Miller et al., *Fiber Fabry-Perot tunable filters improve optical channel analyzer performance*, Micron Optics and Siemens Information & Communication Networks.

Campbell, Scott, Ph.D., "What is an Etalon and How is it Useful in Dispersion Compensation?", Accumux Technologies, Camarillo, CA, 4 pgs, no date.

* cited by examiner

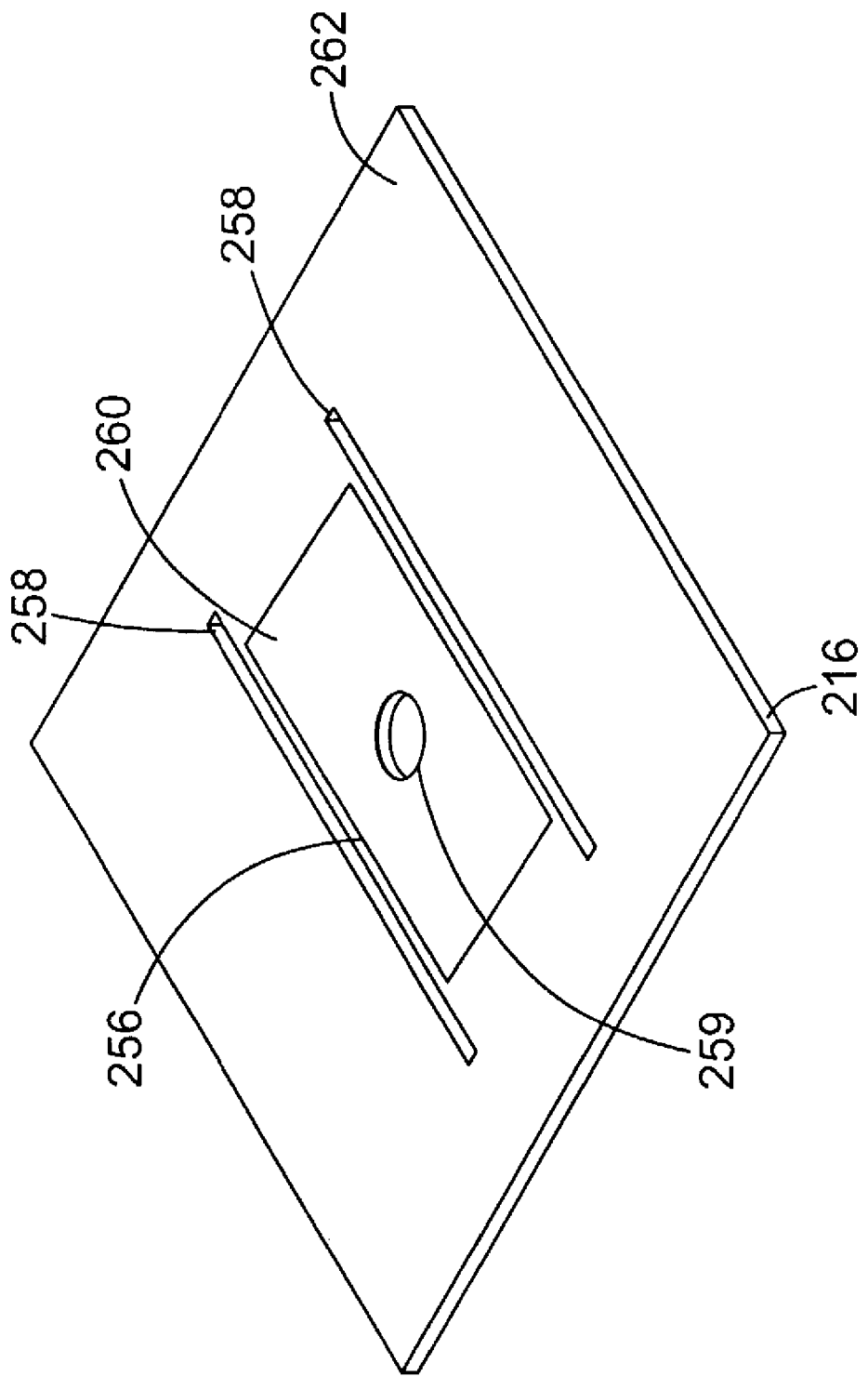

TUNABLE FABRY-PEROT FILTER

FIELD OF THE INVENTION

The present invention is directed to micro-optical devices, and more particularly to a tunable, micro-optic filter.

BACKGROUND

Tunable Fabry-Perot filters (TFPFs) are narrowband wavelength filters that offer the advantage of high optical transmission, low wavefront distortion, low insertion loss, and easy tunability. Consequently, TFPFs are widely applied in fiber optic communications applications, such as WDM, wavelength locking, tunable filter, and the like. TFPFs have been used extensively in WDM systems as tunable de-multiplexers or noise filters within pre-amplified receivers. They are also used for online monitoring of optical channels in DWDM systems.

In order to transmit multiple DWDM channels, the finesse of the TFPF should be about 1000, with a channel spacing of 100 GHz (0.8 nm) and a pass bandwidth of up to 10 GHz (0.08 nm). Current TFPF's based on micro-electromechanical systems (MEMS) do not satisfy the requirements for DWDM applications due to low finesse. The surface quality of the mirrors determines the maximum possible finesse. It is difficult to achieve mirror surfaces in MEMS devices that are as flat and diffraction free as optically polished surfaces, and so it is harder to obtain as high a finesse as is possible with micro-optical components. Another problem for MEMS arises due to the lack of absolute stability of the structure. As a result, it is difficult to maintain perfect parallelism between the mirrors, at a specifically desired mirror separation. It is easy to produce a mirror tilt on the order of 0.01°, resulting in a reduction in the finesse by as much as 10%. Another problem for MEMS is related to the mirror reflectivity. A dielectric mirror having a reflectivity of about 95% can be deposited on a MEMS device without causing residual stress: this results in a maximum finesse of only about 61. Increasing the reflectivity by adding further dielectric coatings results in residual stress that causes deformation of the MEMS mirror, which degrades the finesse for coatings with a reflectivity of >95%.

Another approach to providing an TFPF is a piezo-scanned TFPF, in which the mirrors are provided on two separate substrates and one of the substrates is moved in relation to the other by a piezoelectric transducer. The piezo-scanned TFPF suffers from the normal hysteresis and nonlinearity associated with piezoelectric transducer, however. In addition, these devices have a problem of piezo creep, in which the position of the piezo-scanned mirror changes with time. Thus, the operation of the piezo-scanned TFPF is unstable. Consequently, the piezo-scanned TFPF requires a very complicated control system to compensate for the hysteresis and the creep. Another limitation to the piezo-scanned TFPF is the lack of high expansion coefficient of piezoelectric transducers. Currently, piezo-electric elements are limited to scan ranges of about 10 $\mu$m or less, where the applied voltages and device sizes are reasonable.

SUMMARY OF THE INVENTION

In view of the problems listed above with respect to currently available TFPFs, the present invention is generally directed to a TFPF that uses the hybrid integration of MEMS and micro-optics. Such an approach may be used to overcome the shortcomings of both the MEMS and the piezo-scanned approaches. The device may be used to control the separation between the mirrors to resolutions of picometers while producing a scan range of the order of 30 $\mu$m. Furthermore, the mirrors are formed by depositing coatings on highly polished optical surfaces that are then actively aligned to provide a high finesse TFPF. This approach essentially eliminates the problem of mirror deformation experienced with MEMS mirrors. In addition, a control circuit can compensate for wavelength change due to thermal expansion of the device. Other features of the inventive approach include the ability to use confocal Fabry-Perot (FP) configurations, resulting in higher finesse and resolution. The TFPF may also be used in a cascaded configuration, thus permitting the effective free spectral range to be increased while maintaining the same transmission bandwidth.

In one particular embodiment, the invention is direction to a tunable optical device that comprises first and second reflectors forming a first Fabry-Perot filter having a first optical axis. The first Fabry-Perot filter defines an adjustable gap between the first and second reflectors. One of the first and second reflectors is mounted to a flexible member. The flexible member is deflectable in a direction parallel to the first optical axis so as to adjust the gap between the reflectors.

Anther embodiment of the invention is directed to a method of filtering light using a first Fabry-Perot filter, formed between first and second reflectors. The method comprises passing input light into the first Fabry-Perot filter. A first flexible member is actuated to flex in a direction parallel to the optical axis of the first Fabry-Perot filter. One of the first and second reflectors is attached to the first flexible member, so as to adjust a separation between the first and second reflectors. A resonance of the first Fabry-Perot filter is thereby adjusted to coincide with a desired frequency of the input light.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 2B–2E schematically illustrate embodiments of component parts of the TFPF illustrated in FIG. 2A;

Figure 1:
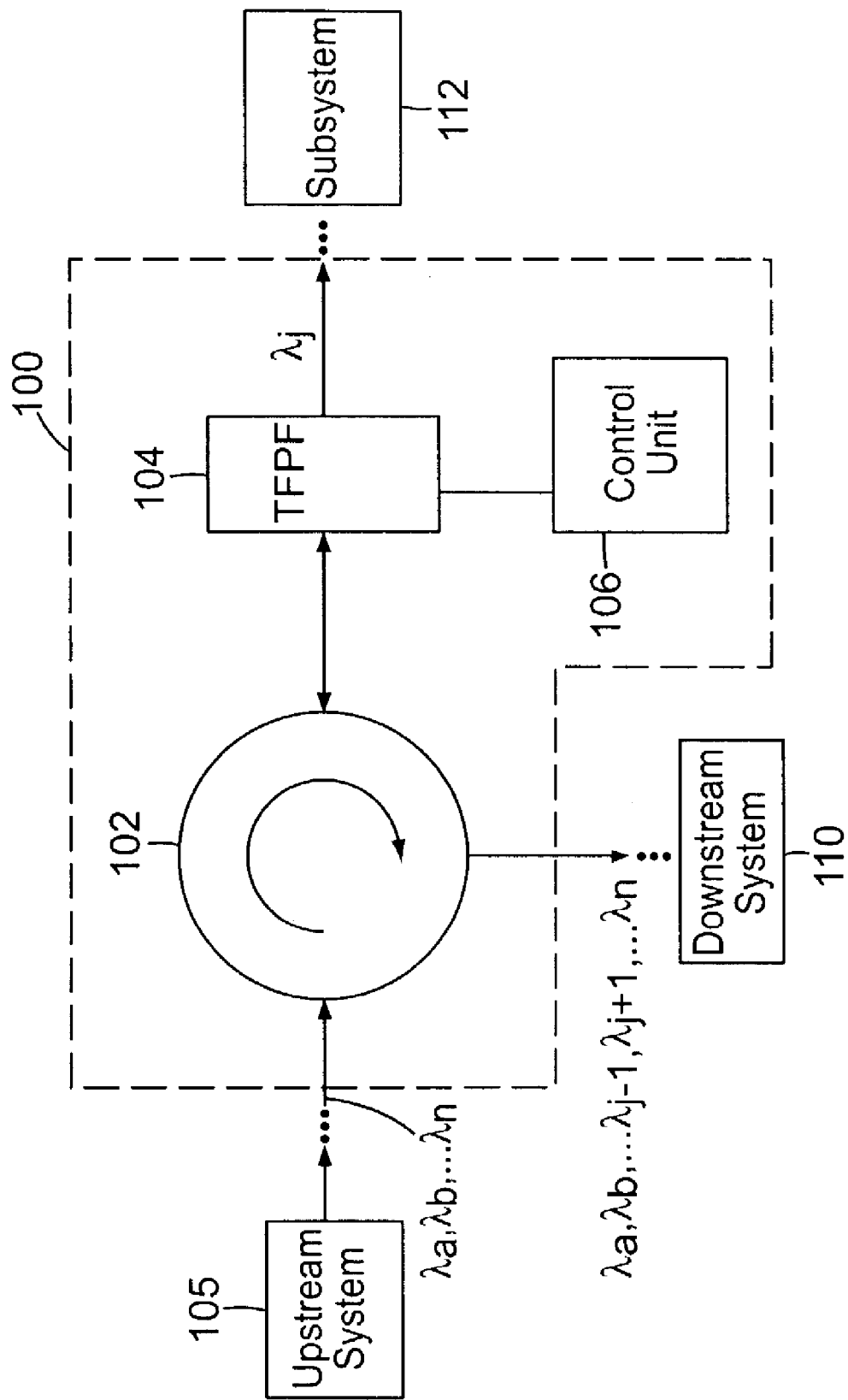
FIG. 1 schematically illustrates an embodiment of a programmable optical add/drop multiplexer system based on a tunable Fabry-Perot filter (TFPF) according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to tunable Fabry-Perot filters (TFPFs) and is believed to be particularly useful for providing a tunable filter having a high finesse, large free spectral range (FSR) and that has long term stability and is that hysteresis-free.

A TFPF, also referred to as a tunable Fabry-Perot resonator, may be used to transmit light in a specific range of wavelengths while rejecting light outside the specific wavelength range. As a result, the TFPF finds many applications in such fields as spectroscopy, optical communications, optical sensors and the like. For example, in spectroscopy and optical sensors, the TFPF may be used to filter light received from a sample. One particular example of using a TFPF in optical communications, is its use in a tunable optical add/drop multiplexer (TOADM). A TOADM, schematically illustrated in FIG. 1, may be used for dropping light in one or more optical channels from a multi-channel signal, or for adding light at one or more channels to a multi-channel signal. The specific embodiment of the TOADM 100 includes a circulator 102 and a TFPF 104. A control unit 106 may be attached to the 104 to control the operational wavelength of the TFPF 104.

In a channel-dropping mode, light in several channels, $\lambda_a$, $\lambda_b$, ..., $\lambda_n$, is incident on the TOADM 100 from an upstream optical system 108, for example a multi-channel optical transmitter, or some other part of an optical communications system. The light in the different channels is transmitted by the circulator 102 to the TFPF 104, which is tuned to transmit light at the wavelength $\lambda_j$. The TFPF 104 reflects light at the other channel wavelengths, $r\lambda_a$, $\lambda_b$, ... $\lambda_{j-1}$, $\lambda_{j+1}$, ... $\lambda_n$. The reflected wavelengths are transmitted back to the circulator 102 which then redirects the reflected wavelengths to a downstream optical system 110, for example a multiple channel receiver/detector system, or some other part of an optical communications system. The light transmitted through the TFPF 104 at $\lambda_j$ is transmitted to an optical subsystem 112, for example a local loop, a receiver/detection system or some other subsystem of the optical communications system. The TFPF 104 may be tuned to transmit light in one of the other channels.

It will be appreciated that several TFPF units may be employed, for example with a multiple port circulator or multiple three port circulators, to drop additional channel wavelengths. Furthermore, it will be appreciated that the TOADM may, for light traveling in the opposite direction to that described above, be used for adding channels.

A TFPF according to principles of the present invention is based on the provision of reflecting surfaces attached to a MEMS displacement actuator. Providing the reflecting surface separate from the MEMS actuator itself permits higher reflectivity mirrors that do not distort, and so the TFPF may achieve higher values of finesse. One or both of the reflecting surfaces may be provided on the end of an optical fiber attached to the MEMS actuator.

One particular embodiment of a TFPF 200 according to the present invention is now described with respect to FIGS. 2A–2F. In this particular embodiment, the TFPF 200 is formed between reflecting surfaces formed on the opposing ends of two optical fibers. A first optical fiber 202 is attached to a first side of an actuator unit 204. The first fiber 202 may be terminated with a first ferrule 206 to provide increased stability and strength. A second fiber 208 is attached to the other side of the actuator unit 204. The second fiber 208 may also be provided with a terminating ferrule 210. The reflecting surfaces define a Fabry-Perot filter, also referred to as a resonator or cavity, that lies on the optical axis 211. The fibers 202 and 208 may be expanded core fibers, whose core is expanded towards the fiber end so that the light exiting the fiber has a divergence less than if the core was not expanded. A control unit 201 may be coupled to the TFPF 200 to control the operation of the TFPF 200.

In this particular embodiment, the actuator unit 204 comprises three elements, a center element 212, a second element 214 and a third element 216, schematically illustrated in FIGS. 2B–2E. The center element 212 is used as a stationary base, also referred to as a stationary member, on which the second and third elements 214 and 216 are mounted. The center element 212 provides electrodes used in actuating the alignment mechanism provided on the second element 214 and the displacement mechanism provided on the third element 216.

Figure 2A:
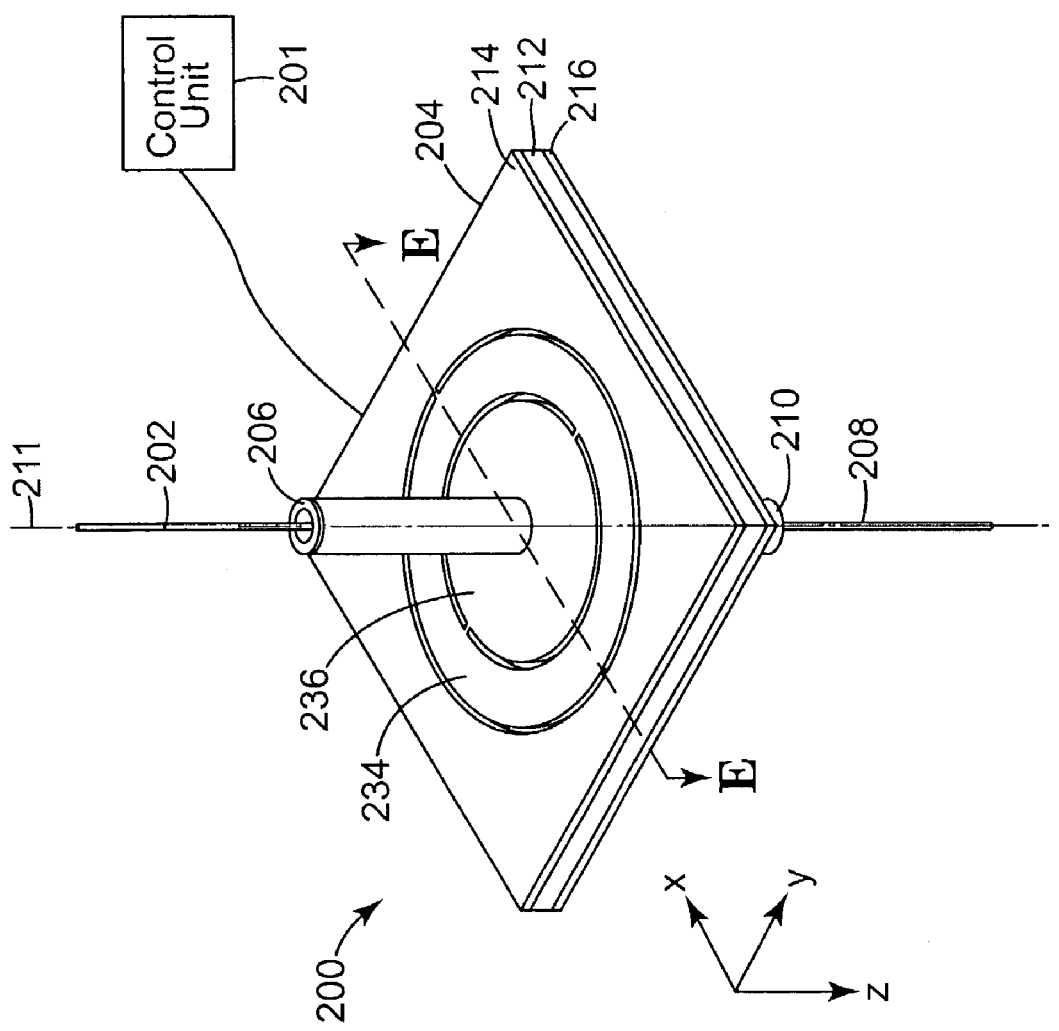
FIG. 2A schematically illustrates an embodiment of a TFPF according to principles of the present invention.
Figure 2B:
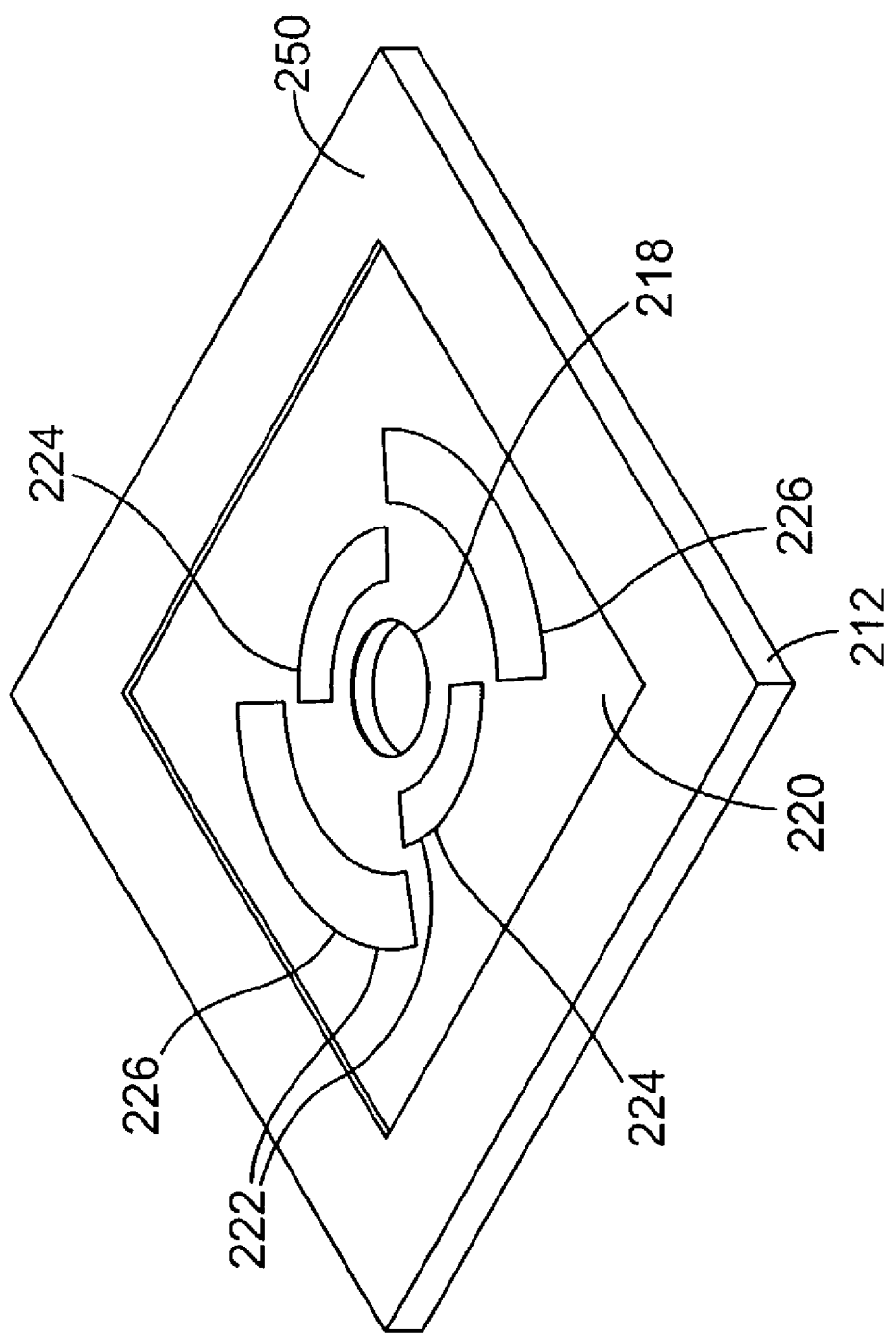
Figure 2C:
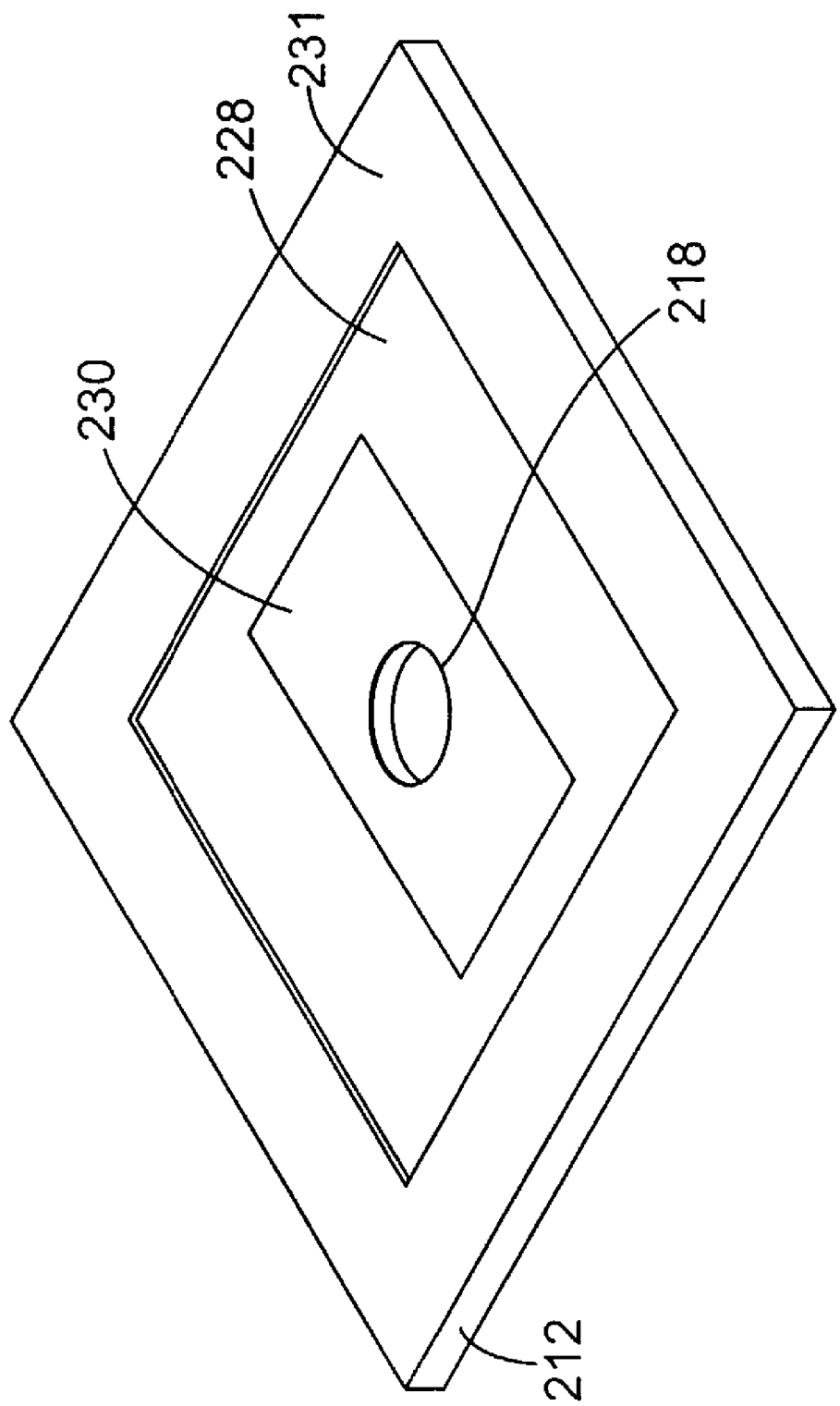

Referring now specifically to FIGS. 2B and 2C, the central element 212 has an aperture 218 through which light passes between the fibers 202 and 208. The first surface 220 includes a pattern of electrodes 222. The pattern of electrodes 222 may include a set of x-electrodes 224 for providing rotational alignment of the fiber 202 in the x-z plane and a set of y-electrodes 226 for providing rotational alignment of the fiber 202 in the y-z plane. The second surface 228 of the central element 212, on the other side from the first surface 220, is also provided with a set of one or more displacement electrodes 230 for controlling the separation between the end of the second fiber 208 and the end of the first fiber 202. The set of one or more displacement electrodes 230 is illustrated as having only one electrode, but it will be appreciated that multiple electrodes may be used.

Figure 2D:
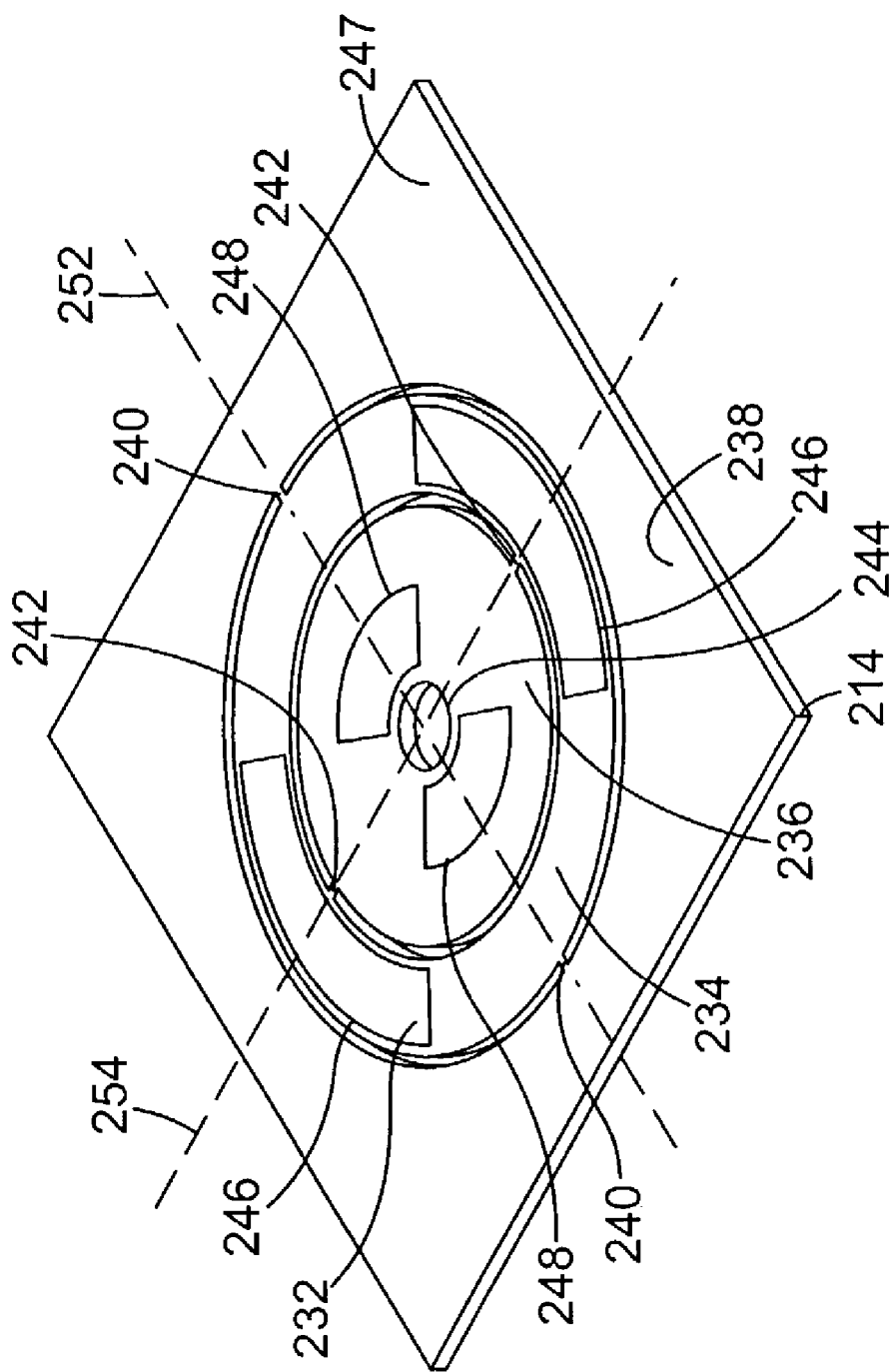
Figure 2F:
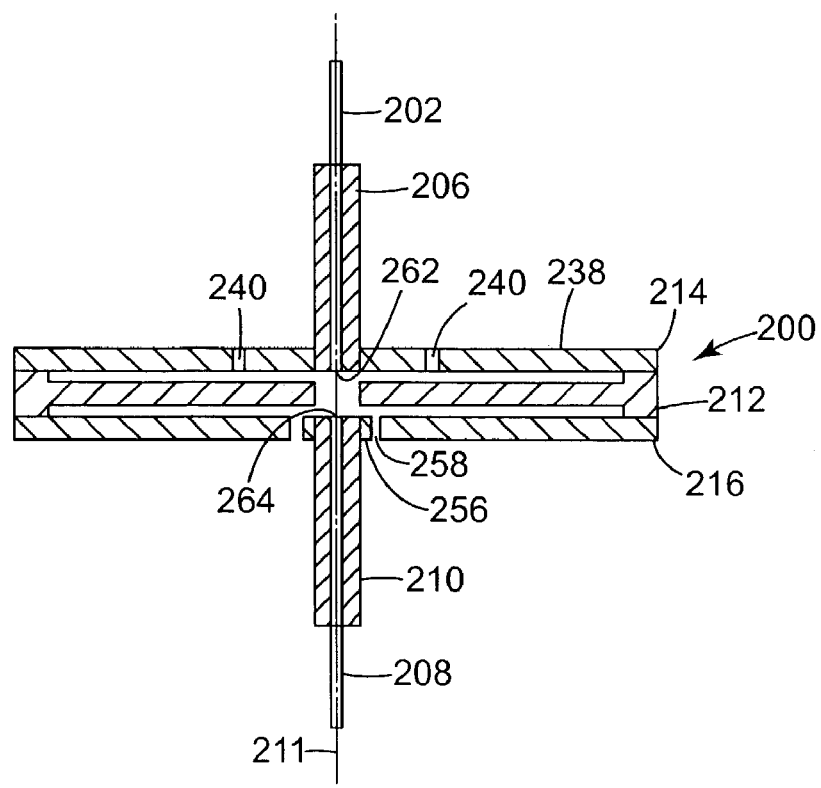
FIG. 2F schematically illustrates a cross-section through the TFPF illustrated in FIG. 2A.

Referring now to FIG. 2D, the second element 214 includes a rotational alignment mechanism 232. In this particular embodiment, the rotational alignment mechanism 232 comprises two concentrically mounted sections 234 and 236 contained within a collar 238. The outer section 234 is attached to the collar 238 by two hinges 240 formed by thin sections of material. The inner ring 236 is attached to the outer ring by two hinges 242, also formed by thin sections of material. An aperture 244 in the inner section 236 permits passage of light between the two optical fibers 202 and 208.

The outer section 234 is provided with two y-electrodes 246 and the inner section 236 is provided with two x-electrodes 248. The second element 214 is mounted by attaching its surface 247 to the mounting surface 250 of the central element 212, so that the x-electrodes 224 of the central element 212 oppose the x-electrodes 248 of the second element 214 and the y-electrodes 226 of the central element 212 oppose the y-electrodes 246 of the second element 214. The second and the third elements 214 and 216 may be attached to the central element 212 using any suitable technique, for example, soldering, fusing or bonding. The maximum alignment in x-z and y-z planes may be of the order of one or two degrees of rotation, or more.

The alignment mechanism 232 operates as follows. Various control voltages may be applied to the x-electrodes 224 and 248 to control the orientation of the first fiber 202 in the x-z plane. The inner section 236 can be rotated about the axis 254 formed by the two hinges 242 by adjusting the control voltages applied to the x-electrodes 224 and 248 so as to provide an unbalanced electrostatic force about the axis 254. Likewise, control voltages may be applied to the y-electrodes 226 and 246 to control the orientation of the first fiber 202 in the y-z plane. The outer section 234 can be rotated about the axis 252 formed by the two hinges 240 by adjusting the control voltages applied to the y-electrodes 226 and 246 so as to provide an unbalanced electrostatic force about the axis 252.

Referring now to FIG. 2E, the third element 216 is provided with a flexible member 256 that permits z-translation so as to tune the Fabry Perot cavity. In the illustrated embodiment, the flexible member 256 is a beam member, formed by cutting two parallel slots 258 in the third element 216. An aperture 259 provided in the beam member 256 permits the light to pass between the first and second fibers 202 and 208. The beam member 256 is provided with one or more electrodes 260 that correspond to the electrodes in the set of electrodes 230 provided on the central element 212. The surface 261 of the third element 216 is attached to the mounting surface 231 of the central element 212 with the electrode 260 opposing the set of electrodes 230.

The separation between the ends 262 and 264 of the fibers 202 and 208 may be varied by adjusting control voltages applied to the electrodes 230 and 260. By applying electric potentials of the same polarity to the electrodes 230 and 260, the beam member 256 is repelled from the central element, and flexes so as to increase the separation between the ends of the fibers 202 and 208 in the z-direction. On the other hand, the z-separation between the ends 262 and 264 of the fibers 202 and 208 is reduced by applying voltages of different polarity to the electrodes 230 and 260, making the beam member 256 flex towards the central element 212.

The different elements 212, 214 and 216 may be formed from any suitable type of material. One particularly suitable type of material is silicon, the various features on the elements may be formed using standard lithographic and etching techniques. One advantage of using silicon is that the beam member may be formed in a single crystal, with the attendant physical properties of single crystals.

One result of using a beam member, constrained at both ends, for displacing one or more of the reflecting surfaces of the TFPF is that the beam member has a constant, prismatic cross-section and is constructed of a flexible, homogenous material that has the same modulus of elasticity in both tension and compression. Thus, the beam member shortens or elongates by the same amount for same applied stress. The beam member is typically operated in the linearly elastic regime, such that the relationship between the applied stress and the resulting strain is directly proportional. Consequently, the beam member shows no hysteresis.

Furthermore, the geometry of a beam constrained at both ends results in an ability to translate the reflecting surfaces without misalignment. This may be explained using a consideration of the neutral plane of the beam. The neutral plane passes through the central cross-section of the beam. When the beam flexes, the material on the outer surface of the flex is put into tension, while the material on the inner surface is put into compression. The neutral plane defines a contour of material that is, under neither tension nor compression when the beam flexes. A plane section through the beam that is perpendicular to the neutral plane before flexing is also perpendicular to the neutral plane after flexing. Consequently, if the reflecting surface is placed halfway between the constrained ends of the beam, and the static forces within the beam member are symmetrical about the center of the beam, the reflecting surface maintains the same orientation when the beam member flexes. In addition, the reflecting surface may be separate from the flexible member and does not change its radius of curvature when the beam member flexes. As a result, the TFPF maintains high finesse even over a large z-displacement of the reflecting surface.

The TFPF 200 may be aligned and operated in the following manner. Once the actuator unit 204 has been assembled with the first and second fibers 202 and 208, an optical test signal is passed from one of the fibers to the other. The optical signal may be outside the preferred wavelength range of operation of the TFPF, so that the reflectivity of the reflective surfaces of the TFPF is reduced. Furthermore, the test signal may have a bandwidth broader than the FSR of the TFPF. The rotational alignment between the fibers 202 and 208 may be adjusted by controlling the voltages applied to the x-electrodes and the y-electrodes on the center element 212 and the second element 214 so as to maximize the amount of light passed between the fibers 202 and 208. Once the optimal orientation has been found for the first fiber 202, the voltages applied to the x-electrodes and y-electrodes may be set constant to maintain constant optical alignment. In another approach to maintaining constant alignment, the center element 212 and the second element 214 may be provided with other charge storage devices, such as electrets, in addition to, or instead of, the electrodes.

Once the fibers 202 and 208 have been aligned, the separation distance between the fiber ends 262 and 264 may be adjusted by controlling the voltage applied to the displacement electrodes 230 and 260 to achieve a desired resonant transmission frequency. The applied voltages may be maintained to maintain the desired separation between the fibers 202 and 208.

The control unit 201 may be used to apply specific voltages to the x-electrodes 224 and 248, the y-electrodes 226 and 246 and/or the displacement electrodes 230 and 260. The control unit may also be used to measure a value of capacitance between electrodes. For example, the x-electrodes 224 and 248 form a capacitor whose value, referred to as x-capacitance, may be measured and stored by the control unit. The control unit may stabilize the value of the x-capacitance by controlling the charge on the x-electrodes 224 and 248. Stabilizing the capacitance ensures that the x-electrodes are maintained at a constant physical separation, thus maintaining constant the alignment of the fiber 202 in the x-z plane. Accordingly, the maintenance of constant x-capacitance and constant y-capacitance permits the orientation of the fiber 202 to be kept constant, without the use of optical feedback. Likewise, the measurement and stabilization of the displacement electrodes 230 and 260, may permit the TFPF to be stabilized at a selected frequency of peak transmission.

Figure 2G:
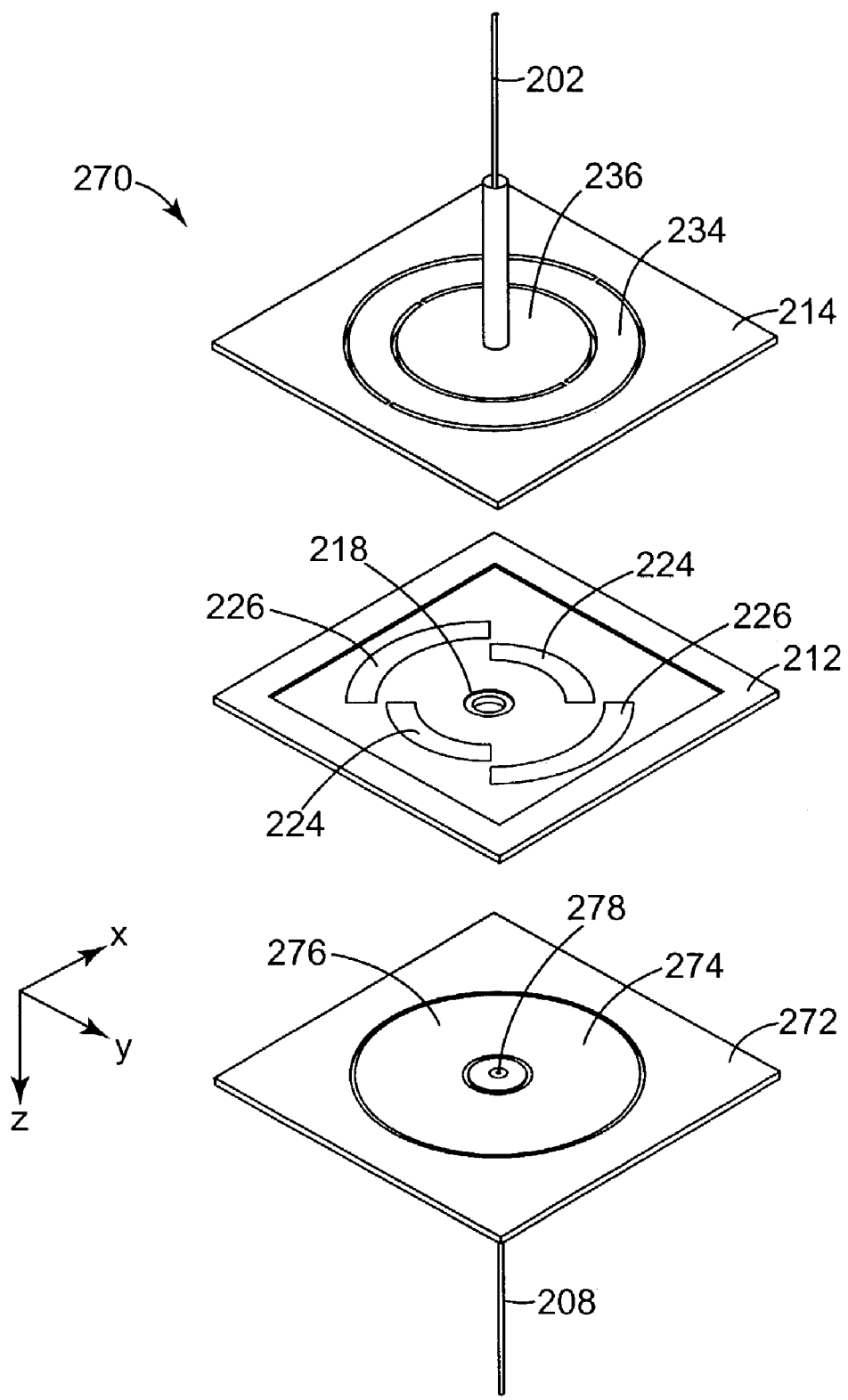
FIG. 2G schematically illustrates another embodiment of a TFPF according to principles of the present invention.

Another embodiment of TFPF 270 is schematically illustrated in exploded form in FIG. 2G. The TFPF 270 includes a central element 212 and second element 214 as described above. The second element 214 is provided with the two sections 234 and 236 that permit the reflector at the end of the fiber 202 to be rotationally aligned with a reflector on the other end of the other fiber 208. In this embodiment, however, the TFPF permits translation of the fiber 208 in the z-direction by moving a flexible member 274 relative to the central member 212. The flexible member 274 need not be a beam member, but may take different geometries. The flexible member is fixed at at least two points about it periphery, with a translatable portion between the fixed peripheral points. In the case of the beam member, there are two fixed points, one at either end of the beam. In the illustrated example, the flexible member 274 is circular and operates like a diaphragm, having what may be viewed as an infinite number of fixed points about its periphery. It will be appreciated that other geometries of flexible member may have other numbers of fixed points about its periphery.

The adjustment of the voltage between an electrode 276 on the flexible member 274 and a corresponding electrode on the underside of the central member 212 (not shown) permits control of the electrostatic force between the flexible 274 member and the central member 212. The resultant elastic deformation of the flexible member 274 changes the separation between the lower fiber 208 and the upper fiber 202, and so the length of the Fabry Perot cavity may be changed.

Use of the flexible member 274 preserves many of the advantages of the beam member discussed above. For example, the electrostatic forces are symmetrical about the reflector at the end of the fiber 208, and so the alignment of the Fabry Perot cavity is maintained even when the reflector is translated.

It will be appreciated that different arrangements of reflector may be used. For example, rather than use a reflector on the end of the fiber 208, a separate reflector may be positioned at the central aperture 278 of the flexible member 274. Furthermore, an additional reflector may be positioned between the reflectors mounted to the second and third elements 214 and 272. For example, an additional reflector may be positioned at the aperture 218 of the central element 212.

It will further be appreciated that the sections 234 and 236 may be regarded as flexible members, since they are fixed at two peripheral points and are free to flex between the fixed points. Accordingly, the absolute values of the voltages applied to the alignment electrodes 224, 226, 246 and 248 may be adjusted, while still maintaining alignment, resulting in flexing of the sections 234 and 236, and of the hinges 240 and 242. This results in a translation of the reflector associated with the second element 214. Accordingly, the second element 214 may be regarded as including a flexible member that permits z-translation of the reflector.

Figure 3A:
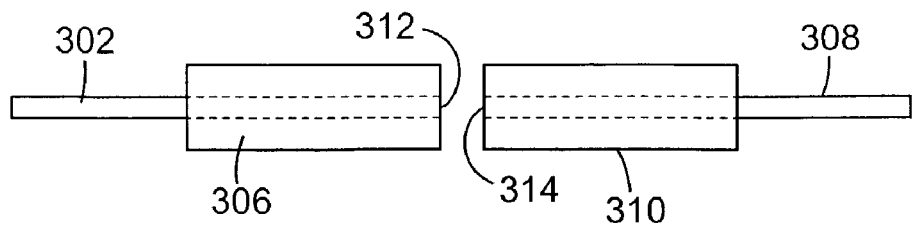
FIGS. 3A–3D schematically illustrate embodiments of configurations of Fabry-Perot filters that may be used in a TFPF according to principles of the present invention.
Figure 3B:
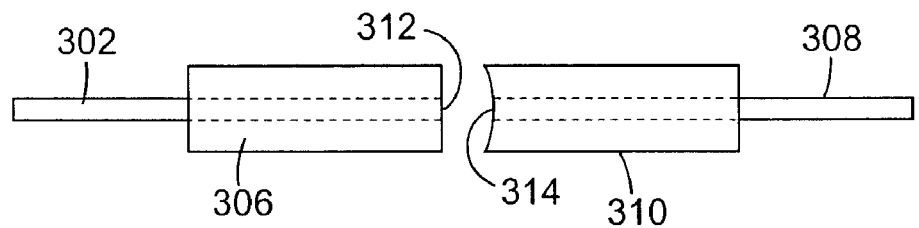

The TFPF may use various FP etalon geometries, some of which are schematically illustrated in FIGS. 3A–3D. FIG. 3A schematically illustrates two fibers 302 and 308, with respective ferrules 306 and 310. Reflective surfaces 312 and 314 are provided on the ends of the fibers 302 and 308. The reflective surfaces 312 and 314 may be formed using a multiple-layer dielectric coating, or some other suitable reflecting material. In practice, the fiber end may be polished once the fiber has been attached to the ferrule, so that the ferrule is also polished. The fiber end and ferrule are then coated with the reflective material. In another approach, the fiber end may be polished with the desired curvature after mounting in the ferrule. The fiber end may then be coated after polishing the ferrule.

In the particular embodiment schematically illustrated in FIG. 3A, the reflective surfaces 312 and 314 are planar and parallel to each other. In the embodiment schematically illustrated in FIG. 3B, one of the reflective surfaces 312 and 314 is curved, while the other is planar. In the illustrated embodiment, the second reflecting surface 314 is curved, but it will be appreciated that the first reflecting surface 312 may be curved.

Figure 3C:
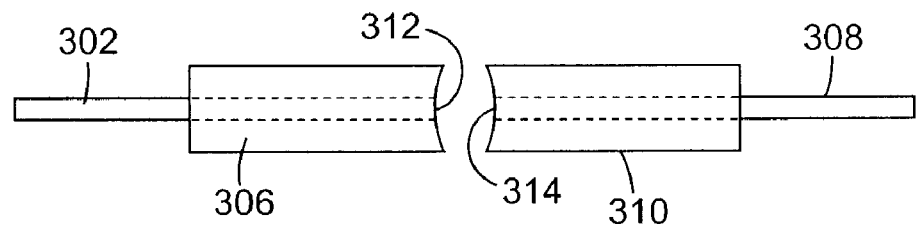

In the embodiment schematically illustrated in FIG. 3C, both of the reflecting surfaces 312 and 314 are curved. The radius of curvature of the reflecting surfaces 312 and 314 may be the same or may be different. If the radius of curvature of the reflecting surfaces 312 and 314 is equal to the separation between the surfaces 312 and 314, then the FP etalon is said to be confocal. When using one or more concavely curved surfaces, the diffraction losses are reduced and the sensitivity to mirror defects is reduced. As a result, higher finesse is more easily attainable with a concavely curved system than with a planar system.

Figure 3D:
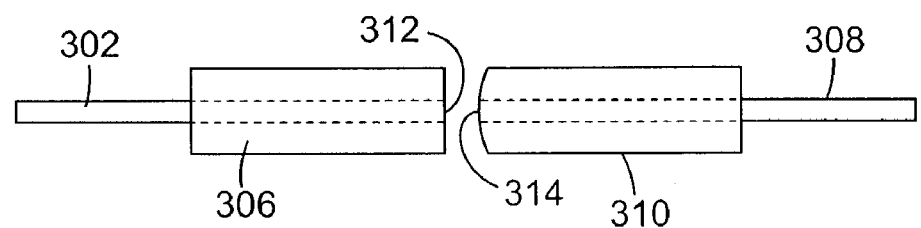

In the embodiment schematically illustrated in FIG. 3D, one of the reflecting surfaces 314 is provided with a convex curve. It will be appreciated that one or both of the reflecting surfaces 312 and 314 may be curved with a convex shape, or the reflecting surfaces 312 and 314 may be each be curved with either a concave shape or a convex shape.

The TFPF may also be a Gires-Tournois interferometer, in which light passes into the interferometer through a first reflector and the second reflector is a 100% reflector, or very close to being a 100% reflector. The output from a Gires-Tournois interferometer reflected, rather than transmitted. However, because it takes a certain time for light at the resonant frequencies of the Gires-Tournois interferometer to build up within the interferometer, there is a delay between the reflection of resonant and non-resonant light. Consequently, the Gires-Tournois interferometer is useful for adding temporal delay to light at certain frequencies and finds use, for example, in compensating for group velocity dispersion.

Figure 4:
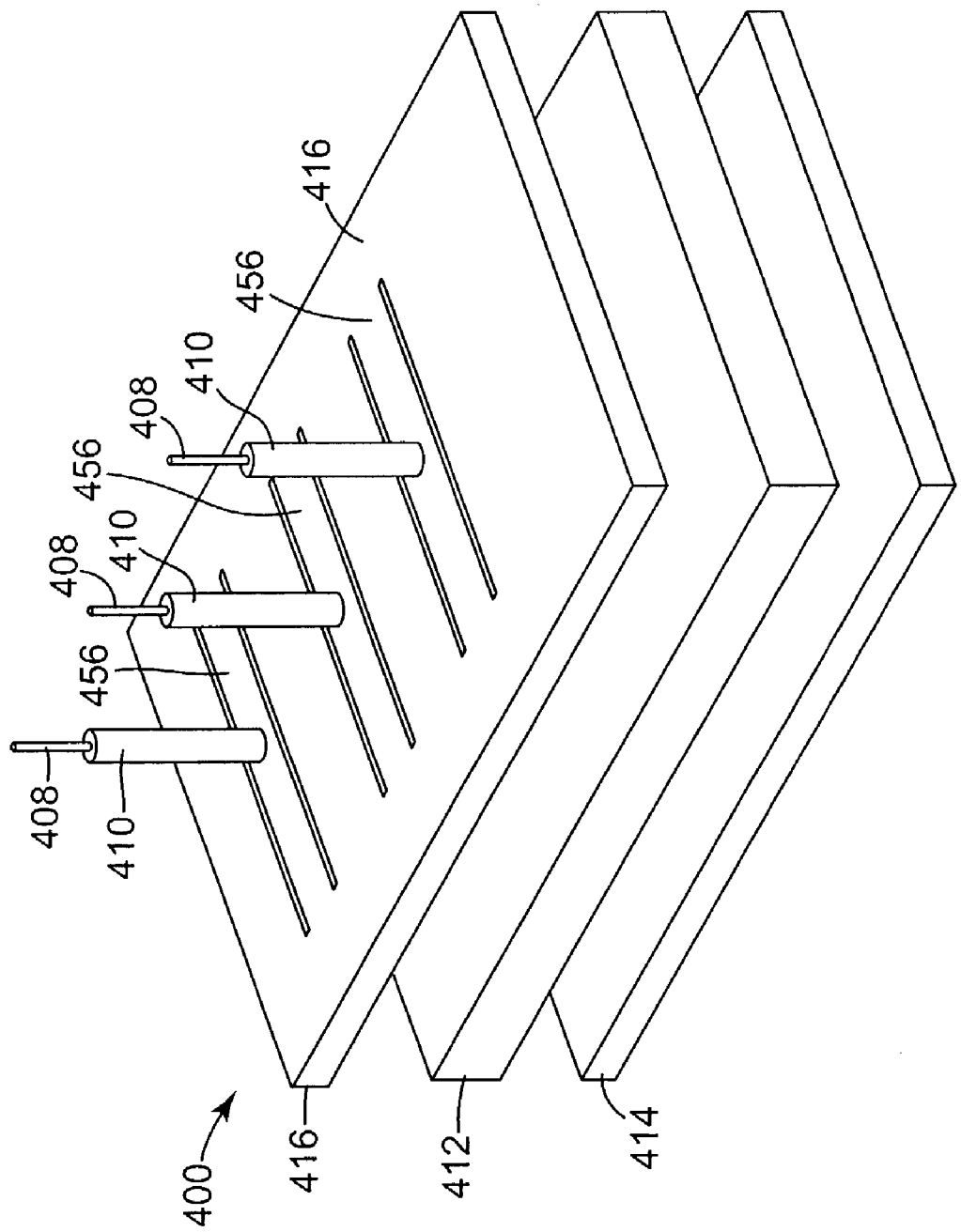
FIG. 4 schematically illustrates an embodiment of multiple TFPF units on an actuator unit, according to principles of the present invention.

The embodiment illustrated in FIGS. 2A–2F is directed to a single TFPF formed on an actuator unit. This is not a limitation on the invention, and several TFPFs may be formed on the actuator unit, each TFPF individually addressable and tunable. An example of multiple TFPF actuator unit 400 is schematically illustrated in exploded form in FIG. 4. A third element 416 includes several beam members 456 arranged on the element 416, with respective fibers 408 and ferrules 410. The third element 416 is mounted to a central element 412 that includes multiple apertures to permit passage of the light between the various fibers that form the TFPFs. The central element 412 may also be provided with appropriate electrodes for individual activation of the different beam members 456. A second element 414, provided with multiple alignment mechanisms, may be attached to the other side of the central element 412. The alignment mechanisms on the second element 414 are appropriately positioned to align with the beam members 456 on the third element 416. Thus, several TFPFs may be fabricated on the same TFPF actuator unit 400.

Figure 5A:
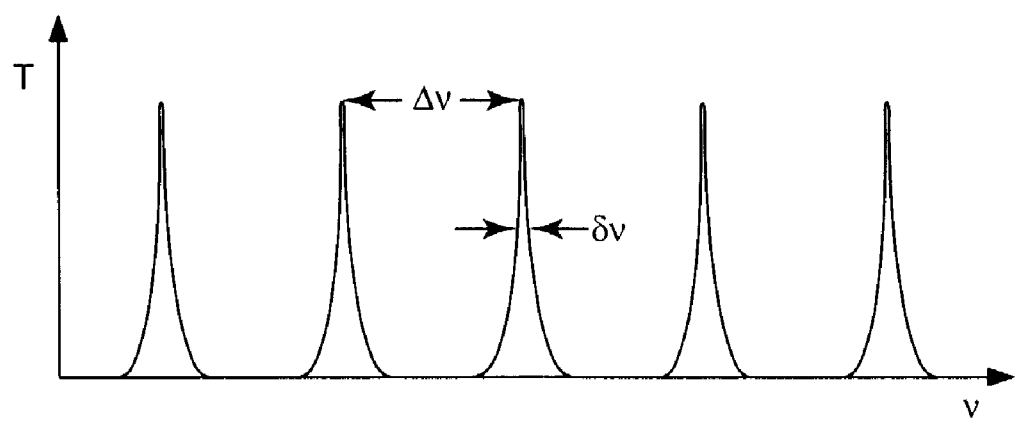
FIG. 5A presents a graph showing a transmission profile of a first Fabry-Perot filter having a first free spectral range
Figure 5B:
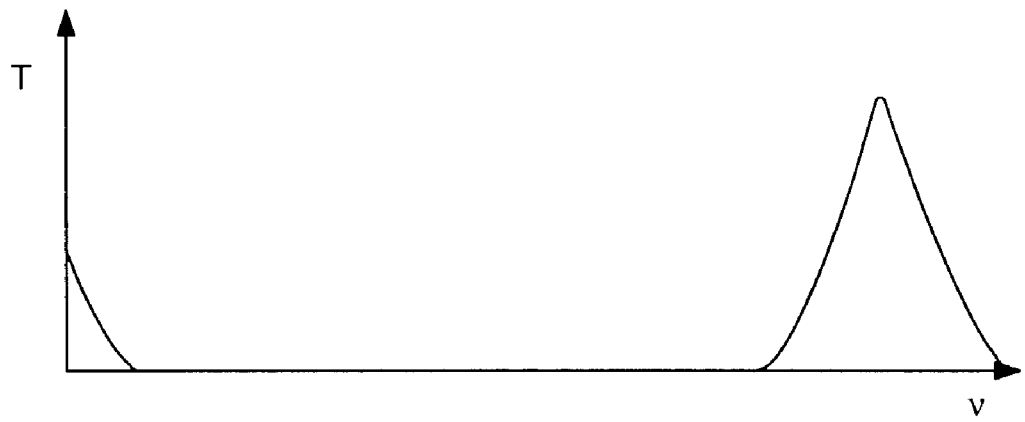
FIG. 5B presents a graph showing a transmission profile of a second Fabry-Perot having a second free spectral range.

More than one Fabry-Perot filter (FPF) may be used in series in order to provide increased optical resolution. This is explained with reference to FIGS. 5A–5C. The optical transmission through a first FPF is schematically drawn in FIG. 5A as a function of frequency, v. The separation between the transmission maxima, Δv, also known as the free spectral range (FSR), is given by the expression:

$$\Delta v = c/(2nL)$$

where c is the speed of light, n is the average refractive index between the reflecting surfaces and L is the separation between the reflecting surfaces. The bandwidth of each transmission peak, δv, the full width at half maximum bandwidth, FWHM, is given by the FSR divided by the finesse, F, in other words δv=FSR/F. Under ideal conditions of alignment and perfect reflecting surfaces, the finesse, F, is given by:

$$F = \pi R^{1/2}/(1-R)$$

where R is the reflectivity and is close to unity. Thus, the finesse increases as the reflectivity of the reflecting surfaces approaches 100%.

Increasing the separation distance between the reflecting surfaces results in an increased separation between the transmission peaks, but also results in an increased bandwidth, since the finesse is assumed to be constant. This is illustrated in graph FIG. 5B, in which the reflecting surfaces are assumed to have the same reflectivity as those used in the FPF of FIG. 5A, but the separation distance between the reflecting surfaces is increased. The bandwidth of the transmission peak remains a constant fraction of the inter-peak separation.

Figure 5C:
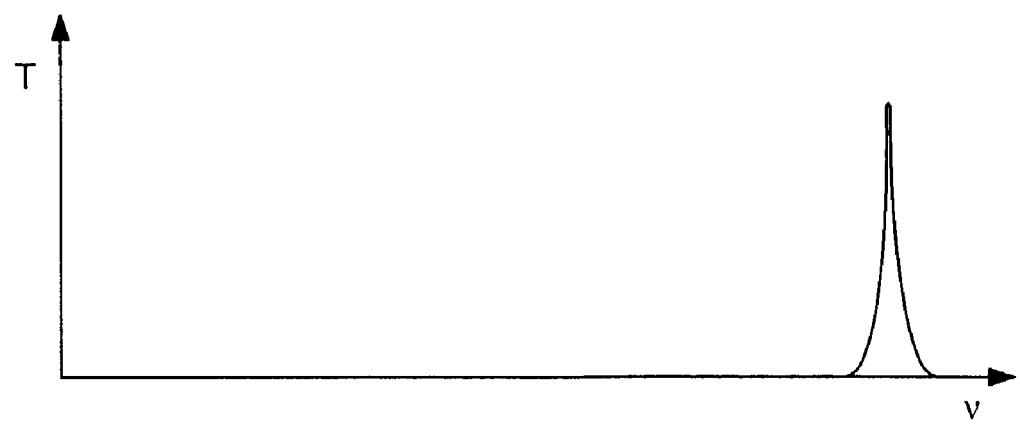
FIG. 5C presents a graph showing a transmission profile of a dual stage Fabry-Perot filter having the first and second Fabry-Perot filters.

An approach to achieving both narrow transmission bandwidth and large FSR is to operate at least two FPFs in series. An example of the filter transmission spectrum of the two stage FPF is as shown in FIG. 5C. The resulting dual stage filter shares the narrow transmission bandwidth of the FPF shown in FIG. 5A with the large FSR of the FPF shown in FIG. 5B. It will be appreciated that, for optimum performance, the transmission spectra of both the FPFs should be near coincidence in frequency.

An example of the benefits to be gained by using a dual-stage TFPF may be understood by considering a single TFPF having a finesse of 150 (corresponding to a filter reflectivity of about 98%). Where the desired bandwidth is 10 GHz, then the FSR is 1500 GHz. Another TFPF may be added in series, having the same finesse, but having an FSR of 15000 GHz. The combination of the two TFPFs in series is a bandwidth of 10 GHz, but an FSR of 15000 GHz, resulting in an effective finesse of 1500.

Figure 6:
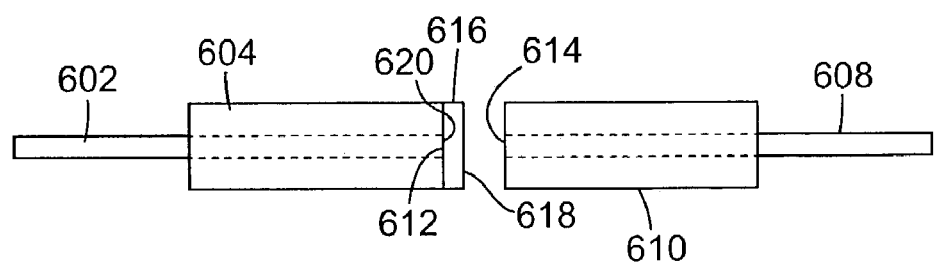
FIG. 6 schematically illustrates an embodiment of a multiple stage TFPF according to principles of the present invention.

One particular approach to a dual stage FPF is schematically illustrated in FIG. 6. A first fiber 602 and ferrule 604 face a second fiber 608 and second ferrule 610. The first fiber 602 has a first reflective surface 612 and the second fiber 608 has a second reflective surface 614. A transparent substrate 616 is mounted next to the first fiber 602, and has a third reflective surface 618 disposed at a fixed distance relative to the first reflective surface 612. The input surface 620 of the substrate 616 is typically anti-reflection (AR) coated, so as to reduce reflections. Thus, one FPF is formed between the first reflective surface 612 and the third reflective surface 618 and a second FPF is formed between the third reflective surface 618 and the second reflective surface 614. The spacing between the second and third reflective surfaces 614 and 618 may be adjusted, for example using an actuator as described above. The spacing between the first and third reflective surfaces 612 and 618 is not adjustable using the actuator.

One approach to forming the first and third reflective surfaces 612 and 618 on the end of the fiber 602 is to deposit first the first reflector 612. The first reflector 612 may be in the form of a multiple layer dielectric mirror, formed from a stack of quarter wavelength thick layers of alternating high and low refractive index material. Next, the substrate layer 616 may be deposited as a single layer having a thickness that is an integral number of half wavelengths thick at the design wavelength. The third reflector 618 may then be deposited over the substrate layer 616, also as a quarter-wavelength stack.

This dual stage FPF is useful for applications where the separation between the first and third reflective surfaces 612 and 618 need not be adjustable, for example because the spacing between these surfaces 612 and 618 produces a fixed frequency separation in the first FPF that corresponds to, for example, a set of equally spaced apart frequencies, as might be found with a DWDM signal. The second stage FPF, whose reflector separation is adjustable and is, therefore, tunable, may be used to select one of the transmission peaks of the first FPF.

Figure 7A:
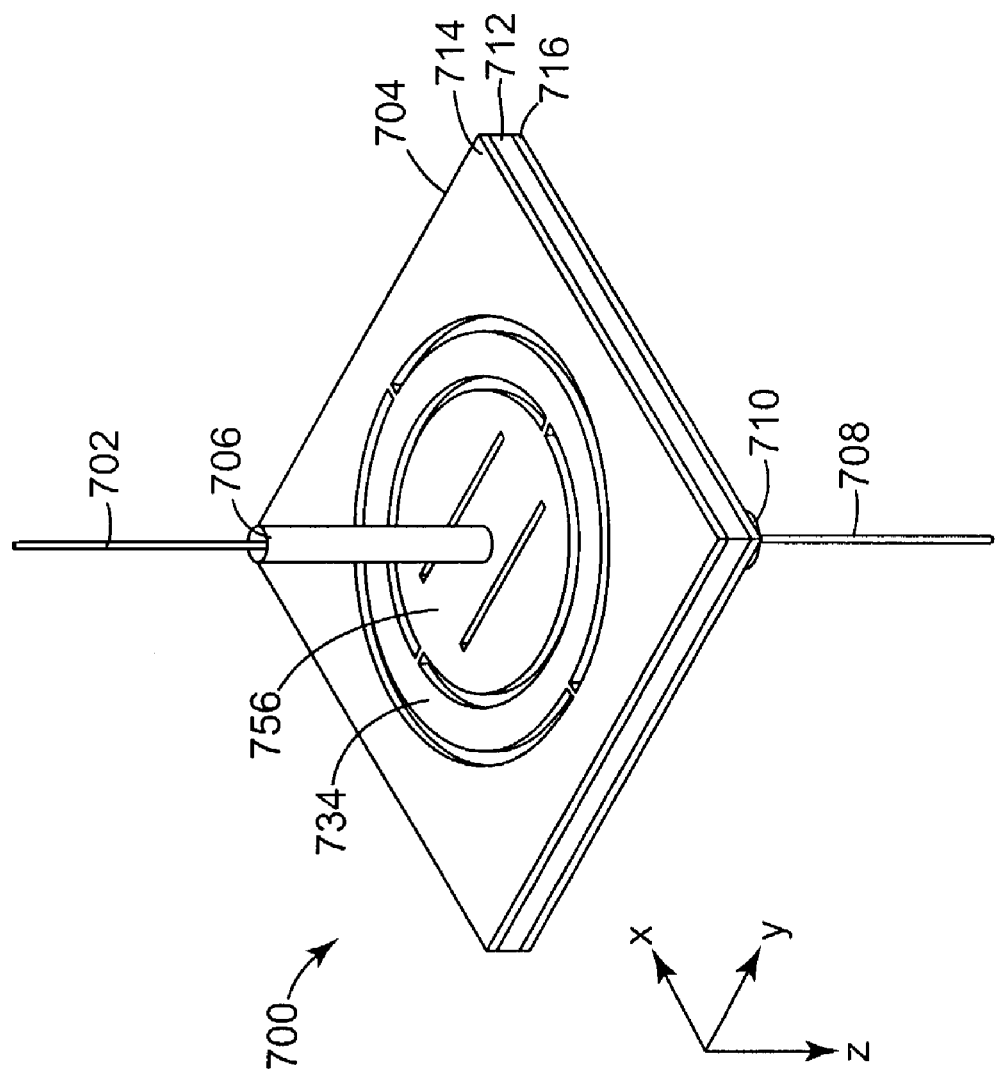
FIGS. 7A and 7B schematically illustrate another embodiment of a multiple stage TFPF according to principles of the present invention.
Figure 7B:
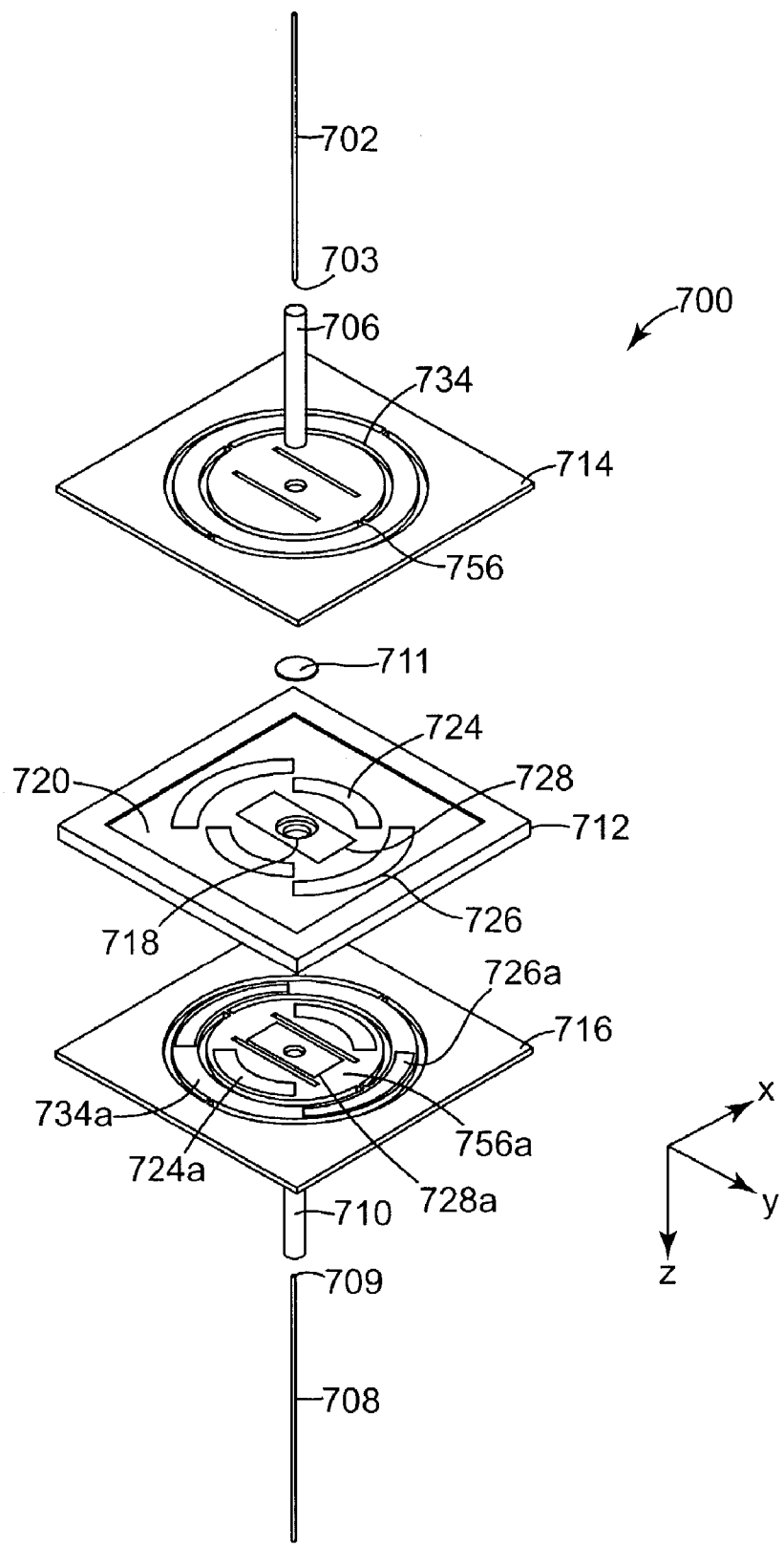

Another type of dual-stage FPF is now described with reference to FIG. 7A, which schematically shows a perspective view, and FIG. 7B, which schematically shows an exploded view. In this embodiment of dual stage FPF 700, both the FPF stages are tunable. The dual stage TFPF is formed between reflecting surfaces on the opposing ends of two optical fibers and a fixed reflector positioned between the fiber ends. A first optical fiber 702 is attached to a first side of the actuator 704. The first fiber 702 may be terminated with a first ferrule 706 to provide increased stability and strength. A second fiber 708 is attached to the other side of the FP actuator 704. The second fiber 708 may also be provided with a terminating ferrule 710. The end 703 of the first fiber is provided with a reflective surface and the end 709 of the second fiber is provided with a reflective surface. A reflector 711 is disposed between the fiber ends 703 and 709. The reflector 711 is typically formed on one side of a substrate, the other side of the substrate being provided with an AR coating to reduce reflections. The reflector 711 may be mounted to the center element 712, for example close to, or in, the aperture 718.

In this particular embodiment, the second element 714 includes both an alignment mechanism 734, for rotationally aligning the first fiber 702 to the reflector 711, and a beam member 756 for altering the separation distance between the fiber end 703 and the reflector 711. Consequently, the center element 712 includes on its upper surface 720 a set of x-electrodes 724, for tilting the fiber 702 in the x-z plane, a set of y-electrodes 726 for tilting the fiber 702 in the y-z plane, and a set of one or more beam member electrodes 728 for flexing the beam member 756. The underside (not shown) of the second element 714 is provided with respective electrode sets corresponding to the x-electrodes 724, the y-electrodes 726 and the beam member electrodes 728. Consequently, controlled adjustment of the relative potentials on the different electrode sets results in controlled rotational adjustment and displacement of the first fiber end 703 relative to the reflector 711.

The third element 716 is also provided with both an alignment mechanism 734a, for rotationally aligning the second fiber 708 to the reflector 711, and a beam member 756a for altering the separation distance between the second fiber end 709 and the reflector 711. Consequently, the center element 712 includes on its lower surface (not shown) a set of x-electrodes for tilting the second fiber 708 in the x-z plane, a set of y-electrodes for tilting the second fiber 708 in the y-z plane, and a set of beam member electrodes for flexing the beam member 756a. The upper surface of the third element 716 is provided with respective electrode sets 724a, 726a and 728a corresponding respectively to the lower x-electrodes, y-electrodes and beam member electrodes on the central element 712. Consequently, controlled adjustment of the relative potentials on the different electrode sets results in controlled rotational adjustment and displacement of the second fiber end 709 relative to the reflector 711.

The ferrules 706 and 710 may be attached to the second and third elements 714 and 716 respectively, for example using solder or epoxy, and the second and third elements 714 and 716 attached to either side of the central element 712 to produce a dual stage TFPF device. Each of the FP filters in the dual stage TFPF device 700 is tunable independent of the other filter, so that a wide variety of frequencies may be accessed by the TFPF.

Figure 8A:
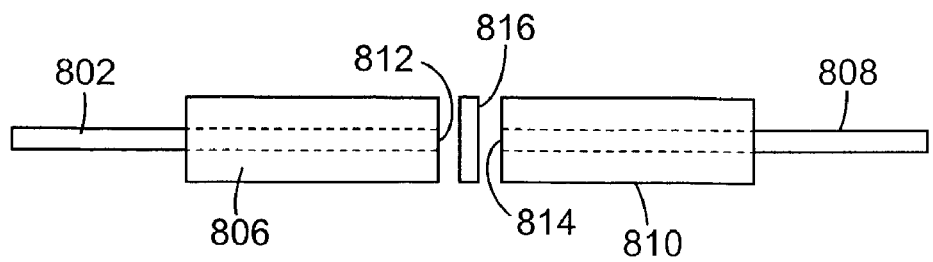
FIGS. 8A–8D schematically illustrate embodiments of configurations of multiple stage Fabry-Perot filters that may be used in a multiple stage TFPF according to principles of the present invention.
Figure 8B:
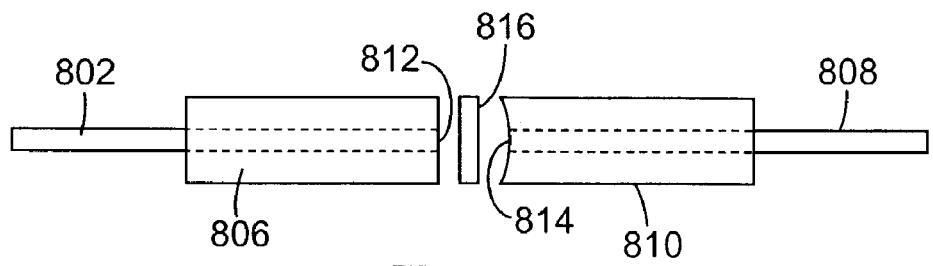

A dual stage TFPF may use various FP etalon geometries, some of which are schematically illustrated in FIGS. 8A–8D. FIG. 8A schematically illustrates two fibers 802 and 808, with respective ferrules 806 and 810. Reflective surfaces 812 and 814 are provided on the ends of the fibers 802 and 808. The reflective surfaces 812 and 814 may be formed using a multiple-layer dielectric coating, or some other suitable reflecting material. A third reflective surface 816 is positioned between the two fibers 802 and 808, corresponding to the reflector 711. Thus, the reflective surfaces 812 and 814 may be displaced relative to the third reflective surface 816 depending on the operation of the respective beam members for the first and second fibers 802 and 808.

In the particular embodiment schematically illustrated in FIG. 8A, the reflective surfaces 812 and 814 are planar and parallel to each other. The reflecting surface 816 is shown to be planar, although it will be appreciated that the reflecting surface 816 may be concave or convex. In the embodiment schematically illustrated in FIG. 8B, one of the reflective surfaces 812 and 814 is curved, while the other is planar. In the illustrated embodiment, the second reflecting surface 814 is curved, but it will be appreciated that the first reflecting surface 812 may be curved. The reflecting surface 816 may also be flat or curved, either concave or convex.

Figure 8C:
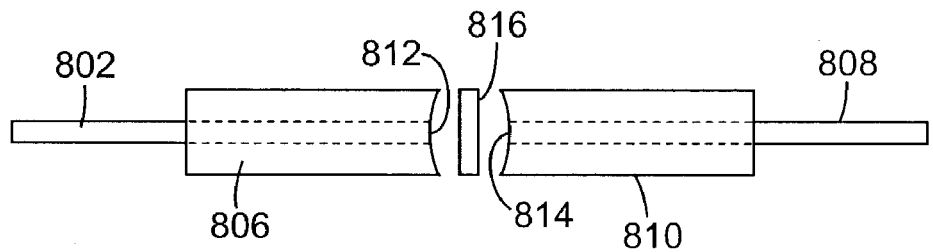

In the embodiment schematically illustrated in FIG. 8C, both of the reflecting surfaces 812 and 814 are curved, while the third reflecting surface 816 remains planar. The radii of curvature of the reflecting surfaces 812 and 814 may be the same as each other or may be different. It will be appreciated that the reflecting surface 816 may be flat or curved, concave or convex.

Figure 8D:
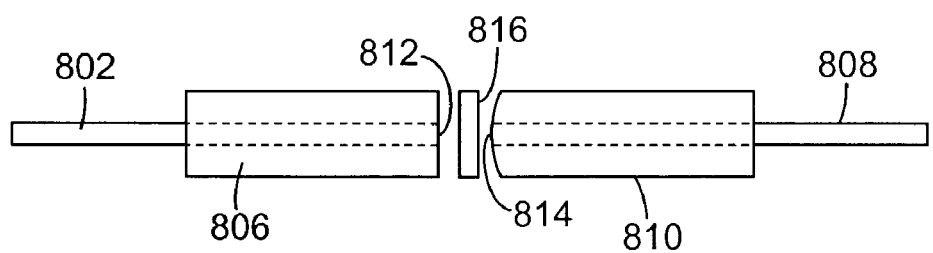

In the embodiment schematically illustrated in FIG. 8D, one of the reflecting surfaces 814 is provided with a convex curve, rather than a concave curve. It will be appreciated that one or both of the reflecting surfaces 812 and 814 may be curved with a convex shape, or the reflecting surfaces 812 and 814 may be each be curved with either a concave shape or a convex shape. In addition, the third reflecting surface 816 is concave. It will also be appreciated that the third reflecting surface may be curved so as to be concave towards the first fiber 802 or towards the second fiber 808.

Figure 9:
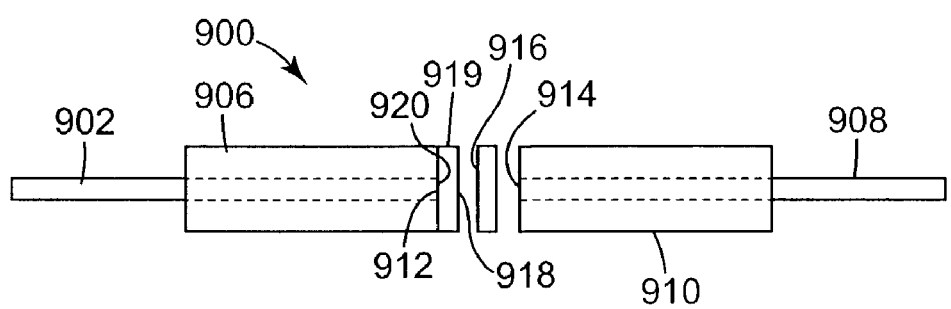
FIG. 9 schematically illustrates another embodiment of a configuration of multiple stage Fabry-Perot filter that may be used in a multiple stage TFPF according to principles of the present invention.

Another approach to a multiple stage TFPF 900 is schematically illustrated in FIG. 9. A first fiber 902 and ferrule 906 face a second fiber 908 and second ferrule 910. The first fiber 902 has a first reflective surface 912 and the second fiber 908 has a second reflective surface 914. A third reflective surface 916 is disposed between the first and second fibers 902 and 908. The first and second fibers 902 and 908 may be independently movable relative to the third reflective surface 916, for Fabry-Perot tuning. A fourth reflective surface 918, disposed on a substrate 919 is disposed at a fixed distance relative to the first reflective surface 912. The input surface 920 of the substrate 919 is typically anti-reflection (AR) coated, so as to reduce reflections. Thus, one FPF is formed between the first reflective surface 912 and the fourth reflective surface 918, a second FPF is formed between the fourth reflective surface 918 and the third reflective surface 916 and a third FPF is formed between the third reflective surface 916 and the second reflective surface 914. The spacing between the first and fourth reflective surfaces 912 and 918 is typically fixed, whereas the separations between the fourth and third reflective surfaces 918 and 916, and between the third and second reflective surfaces 916 and 914 are adjustable using the TFPF actuator.

Figure 10:
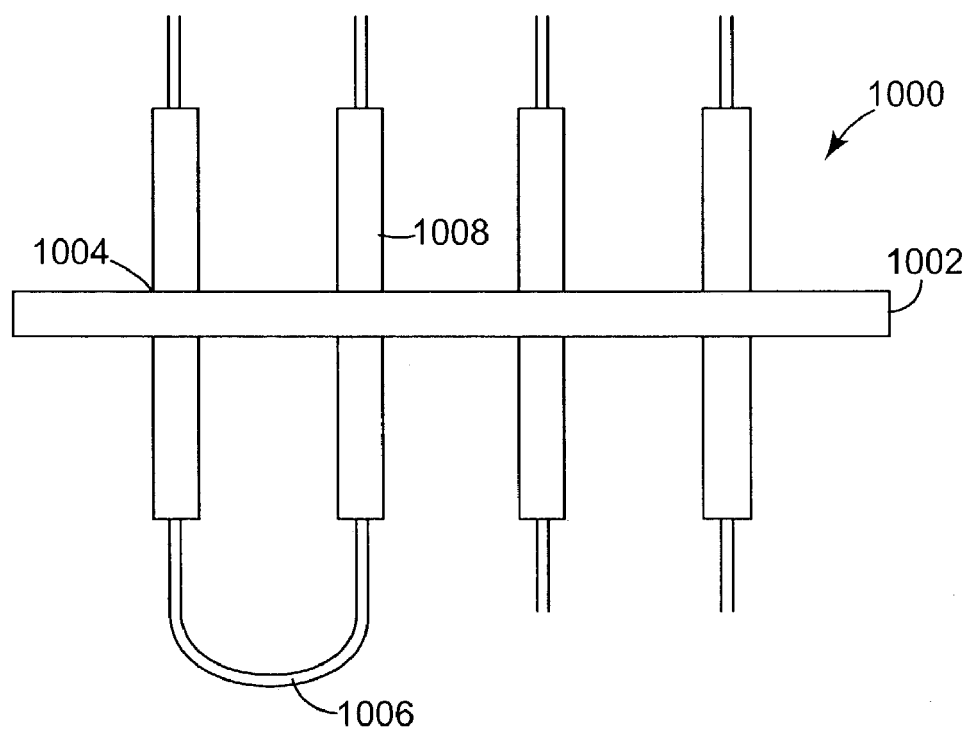
FIG. 10 schematically illustrates another embodiment of a multiple stage TFPF using back-to-back TFPFs mounted on an single actuator unit, according to principles of the present invention.

Another approach to forming a multiple stage TFPF 1000 is depicted schematically in FIG. 10. The multiple stage TFPF is formed, in this embodiment, using multiple TFPFs on a single actuator assembly 1002. A first TFPF 1004 is connected in series by fiber 1006 with a second TFPF 1008. In some embodiments, one of the reflectors of the first or second TFPFs 1004 and 1008 may be replaced with an anti-reflection coating, so that the resulting dual stage TFPF is formed by three reflecting surfaces. Since the fiber 1006 has a minimum bend radius, the cavity containing the fiber 1006 is typically at least several mm in length, for example 20 mm or more. Where the anti-reflection coating is disposed on side of the one TFPF closer to the other TFPF, then the resulting dual stage TFPF is formed by two, independently tunable TFPFs, separated by a cavity containing the fiber 1006.

An etalon cavity having a cavity length of longer than about 20 mm has a narrower FSR and bandwidth than some of the other embodiments described herein. For example, the FSR of this TFPF may be less than 4 GHz, with a resolution in the MHz range. Such a TFPF may be used for measuring laser linewidths, or detecting laser mode structure, sidemode suppression, wavelength chirp, or modulation content.

The present invention is considered to cover many variations of the invention disclosed above. For example, a single stage TFPF may be formed using an actuator unit that includes both rotational and displacement transducers on the one element, such as was discussed with regard to the embodiments described in FIGS. 7A and 7B. In another example, although the TFPF has been described in terms of using a Fabry Perot filter in which a reflector formed on the end of an optical fiber is axially displaced to tune the TFPF, it will be appreciated that other types of reflectors may be displaced. For example, a reflector disposed on a substrate may be mounted to displacement transducer. Furthermore, the adjustments of the TFPF, including orientation and displacement, may each be controlled using electrodes, electrets, or a combination of electrodes and electrets.

As noted above, the present invention is applicable to holographic exposure techniques and is believed to be particularly useful for exposing grating structures for optical and optoelectronic devices. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

I claim:

1. A tunable optical device, comprising:
   a first optical fiber having an end;
   first and second reflectors separated by a gap along a first optical axis to form a first Fabry-Perot filter, one of the first and second reflectors being provided on the end of the first optical fiber; and
   an elastically flexible member, one of the first and second reflectors being mounted to the flexible member, the flexible member being deflectable in a direction parallel to the first optical axis so as to adjust the gap between the reflectors;
   wherein one of the first and second reflectors is mounted to an adjustable alignment member, the adjustable alignment member being rotatable about a second axis perpendicular to the first optical axis.

2. A device as recited in claim 1, wherein the alignment member is rotatable about a third axis perpendicular to the first and second axes.

3. A device as recited in claim 1, further comprising a stationary member disposed proximate the adjustable alignment member and the flexible member.

4. A device as recited in claim 3, further comprising a set of one or more electrical charge storage elements on the adjustable alignment member and a set of one or more corresponding charge storage elements on the stationary member, the charge storage elements on the adjustable member and the charge storage elements on the stationary member being charged to respective values so as to stabilize the adjustable alignment member in a desired orientation relative to the first optical axis.

5. A device as recited in claim 4, wherein the electrical charge storage elements are electrodes.

6. A device as recited in claim 4, further comprising at least one electrical charge storage element on the flexible member and at least one corresponding electrical charge storage element on the stationary member, wherein adjustment of an electrical potential difference between the at least one charge storage element on the flexible member and the at least one corresponding charge storage element on the stationary member results in flexure of the flexible member.

7. A device as recited in claim 3, wherein the second reflector is mounted to the alignment member and the stationary member is disposed between the flexible member and the alignment member.

8. A device as recited in claim 3, wherein the first reflector is mounted so that orientation of the first reflector is determined by the orientation of the alignment member.

9. A tunable optical device, comprising:
   a first optical fiber having an end;
   first and second reflectors separated by a gap along a first optical axis to form a first Fabry-Perot filter, one of the first and second reflectors being provided on the end of the first optical fiber;
   an elastically flexible member, one of the first and second reflectors being mounted to the flexible member, the flexible member being deflectable in a direction parallel to the first optical axis so as to adjust the gap between the reflectors; and
   a second Fabry-Perot filter optically coupled to the first Fabry-Perot filter, the second Fabry-Perot filter having a free spectral range different from the free spectral range of the first Fabry-Perot filter, so that light filtered by one of the first and second Fabry-Perot filters is also filtered by the other of the first and second Fabry-Perot filters;
   wherein the second Fabry-Perot resonator is formed between the second reflector and a fifth reflector, the fifth reflector being formed on an end of an optical fiber; and
   wherein the fifth reflector is mounted so as to be orientationally adjustable by a second adjustable alignment member, the second adjustable alignment member being rotatable about an axis perpendicular to the first optical axis of the first Fabry-Perot filter.

10. A method of filtering light using a first Fabry-Perot filter, formed between first and second reflectors, the method comprising:
    passing input light into the first Fabry-Perot filter;
    directing the input light along an axis of the first Fabry-Perot filter and within a separation between the first and second reflectors, one of the first and second reflectors being provided on an end of an optical fiber;
    actuating a first flexible member to flex in a direction parallel to the axis of the first Fabry-Perot filter, one of the first and second reflectors being attached to the first flexible member, so as to adjust the separation between the first and second reflectors, thereby adjusting a resonance of the first Fabry-Perot filter to coincide with a desired frequency of the input light; and
    applying electric potentials to electrodes on an alignment member and on a stationary member so as to rotate the alignment member about an axis perpendicular to the axis of the first Fabry-Perot filter, an orientation of one of the first and second reflectors being determined by the orientation of the alignment member.

* * * * *